United States Patent
Faruque et al.

(10) Patent No.: US 12,397,733 B1
(45) Date of Patent: Aug. 26, 2025

(54) SLIDABLE POST WITH AIRBAG FOR WHEELCHAIR OCCUPANTS

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/898,775

(22) Filed: Sep. 27, 2024

(51) Int. Cl.
*B60R 21/20* (2011.01)
*B60R 21/00* (2006.01)
*B60R 21/02* (2006.01)
*B60R 21/16* (2006.01)

(52) U.S. Cl.
CPC ...... *B60R 21/20* (2013.01); *B60R 2021/0032* (2013.01); *B60R 2021/006* (2013.01); *B60R 2021/0213* (2013.01); *B60R 2021/0273* (2013.01); *B60R 2021/161* (2013.01)

(58) Field of Classification Search
CPC ............ B60R 21/20; B60R 2021/0032; B60R 2021/006; B60R 2021/0213
See application file for complete search history.

(56) References Cited

U.S. PATENT DOCUMENTS

| | | |
|---|---|---|
| 3,858,930 A | 1/1975 | Calandra et al. |
| 5,730,458 A | 3/1998 | Byon |
| 5,967,549 A | 10/1999 | Allen et al. |
| 6,435,591 B1 | 8/2002 | Nilsson |
| 10,065,592 B2 | 9/2018 | Jaradi et al. |
| 10,427,634 B2 | 10/2019 | Gandhi et al. |
| 10,583,797 B2 | 3/2020 | Line et al. |
| 10,717,358 B2 | 7/2020 | Patil |
| 10,821,930 B2 | 11/2020 | Malapati et al. |
| 11,091,110 B2 * | 8/2021 | Takemura ............. B60N 3/001 |
| 11,364,872 B1 | 6/2022 | Jaradi et al. |
| 11,370,382 B2 * | 6/2022 | Zhao ................ B60R 21/23138 |
| 11,491,941 B2 | 11/2022 | Nakamura et al. |
| 11,535,186 B2 | 12/2022 | Jaradi et al. |
| 11,577,680 B1 * | 2/2023 | Faruque .................. B60R 21/20 |
| 11,590,921 B1 | 2/2023 | Farooq et al. |
| 11,597,343 B2 | 3/2023 | Buice et al. |
| 11,981,278 B1 | 5/2024 | Jaradi et al. |
| 12,077,119 B1 * | 9/2024 | Jaradi ................... B60R 21/013 |
| 12,115,927 B2 * | 10/2024 | Freisler ................ B60R 21/231 |
| 2005/0127645 A1 | 6/2005 | Smith et al. |

(Continued)

FOREIGN PATENT DOCUMENTS

| | | |
|---|---|---|
| CN | 112109654 A | 12/2020 |
| CN | 113147657 A | 7/2021 |

(Continued)

*Primary Examiner* — Jason D Shanske
*Assistant Examiner* — Tiffany L Webb
(74) *Attorney, Agent, or Firm* — Frank A. MacKenzie; Brooks Kushman P.C.

(57) ABSTRACT

A vehicle includes a vehicle floor and a post supported by the vehicle floor. The post is translatable relative to the vehicle floor. The vehicle includes a support member mounted to the post. The support member is rotatable relative to the post. The vehicle includes an airbag supported by the support member.

20 Claims, 8 Drawing Sheets

(56) References Cited

U.S. PATENT DOCUMENTS

| | | |
|---|---|---|
| 2018/0265027 A1 | 9/2018 | Nusier et al. |
| 2020/0017058 A1 | 1/2020 | Jaradi et al. |
| 2020/0093662 A1 | 3/2020 | Mori |
| 2020/0094766 A1 | 3/2020 | Malapati et al. |
| 2021/0394702 A1 | 12/2021 | Farooq et al. |
| 2022/0063546 A1 | 3/2022 | Jaradi et al. |
| 2022/0134991 A1 | 5/2022 | Farooq et al. |
| 2022/0144205 A1 | 5/2022 | Zhao et al. |
| 2022/0242358 A1 | 8/2022 | Farooq et al. |
| 2024/0109507 A1 * | 4/2024 | Faruque ............ B60R 21/23138 |

FOREIGN PATENT DOCUMENTS

| | | |
|---|---|---|
| CN | 114103865 A | 3/2022 |
| CN | 116142124 A | 5/2023 |
| DE | 102019114894 A1 | 2/2020 |
| DE | 102020111951 A1 | 11/2021 |
| DE | 102021115761 A1 | 12/2021 |
| DE | 102021118495 A1 | 1/2023 |
| DE | 102023112537 A1 | 11/2023 |
| JP | 2017065556 A | 4/2017 |
| JP | 2018127057 A | 8/2018 |
| JP | 2018187950 A | 11/2018 |
| KR | 102005746 B1 | 7/2019 |

* cited by examiner

SLIDABLE POST WITH AIRBAG FOR WHEELCHAIR OCCUPANTS

BACKGROUND

Passenger vehicles are not typically designed to accommodate wheelchairs. Therefore, accommodations for wheelchairs in vehicles are typically installed with aftermarket modifications to a production vehicle. For example, a vehicle may be modified with a lift or the like to load a wheelchair onto a vehicle. Production vehicles typically do not have the ability to accommodate the wheelchair of an occupant in a manner allowing the occupant to sit in the wheelchair in the vehicle, or if they do, significant aftermarket modification is required.

Additionally, vehicles are equipped with airbags which act as supplemental restraints for occupants during certain vehicle impacts. The airbags are located at various fixed positions in occupant compartments of vehicles. Vehicles may include airbags supported on a dash, side air curtains mounted to the roof rails, side airbags mounted to seats, etc.

DETAILED DESCRIPTION

<Insert Claim Summary after Inventor Review>

Figure 1:
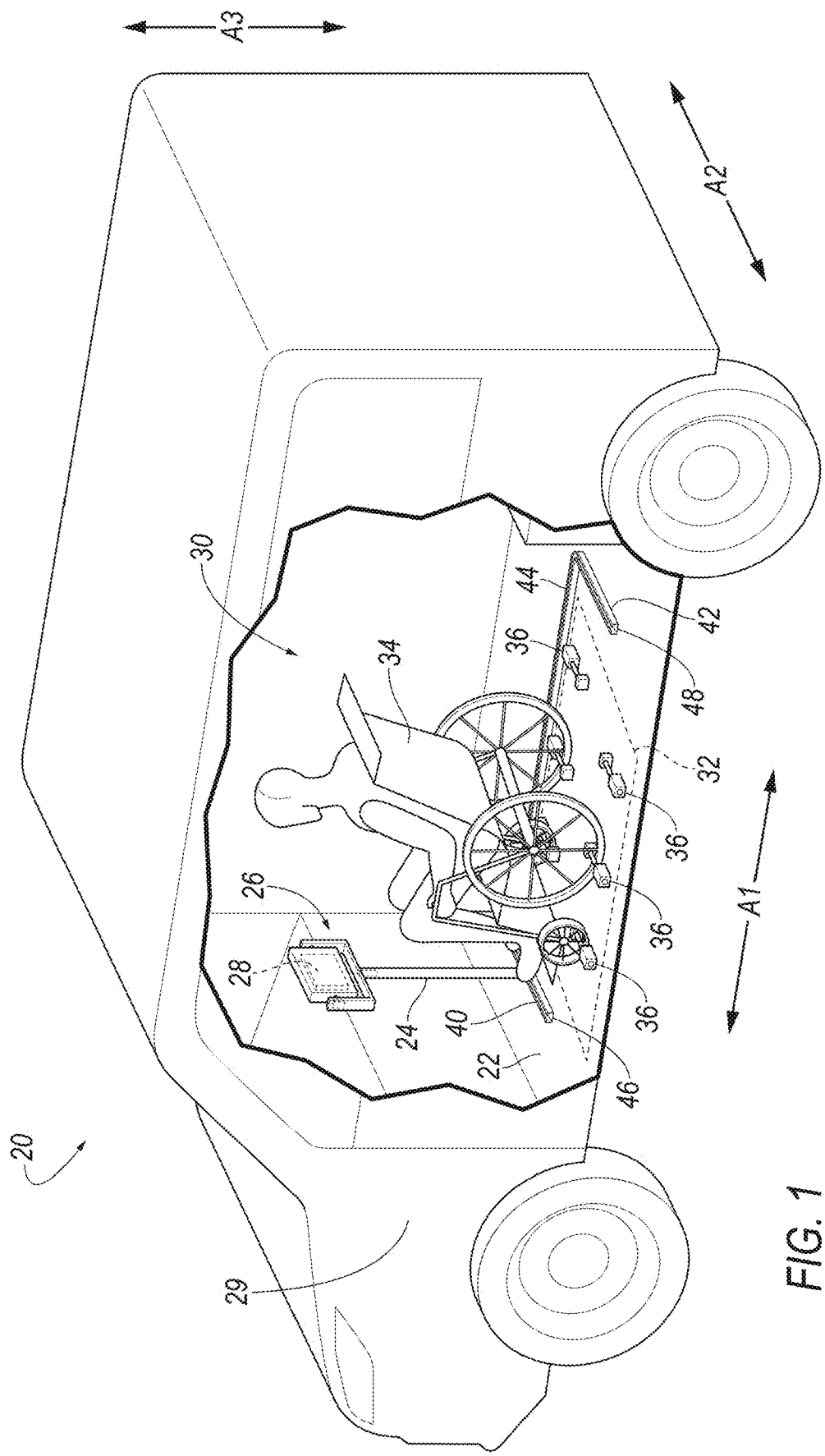
FIG. 1 is a perspective view of a vehicle having a post at a first position and an airbag at an uninflated position.

With reference to the Figures, wherein like numerals indicate like parts throughout the several views, a vehicle 20 having a vehicle floor 22 and a post 24 supported by the vehicle floor 22 is shown. The post 24 is translatable relative the vehicle floor 22. The vehicle 20 includes a support member 26 mounted to the post 24. The support member 26 is rotatable relative to the post 24. The vehicle 20 includes an airbag 28 supported by the support member 26.

Translation of the post 24 relative to the vehicle floor 22 enables the airbag 28 to be repositioned within the vehicle 20. For example, the post 24 may be translated to a first position to control kinematics of a front-facing occupant of the vehicle 20 and may be translated to a second position to control kinematics of a rear-facing occupant of the vehicle 20.

Figure 2:
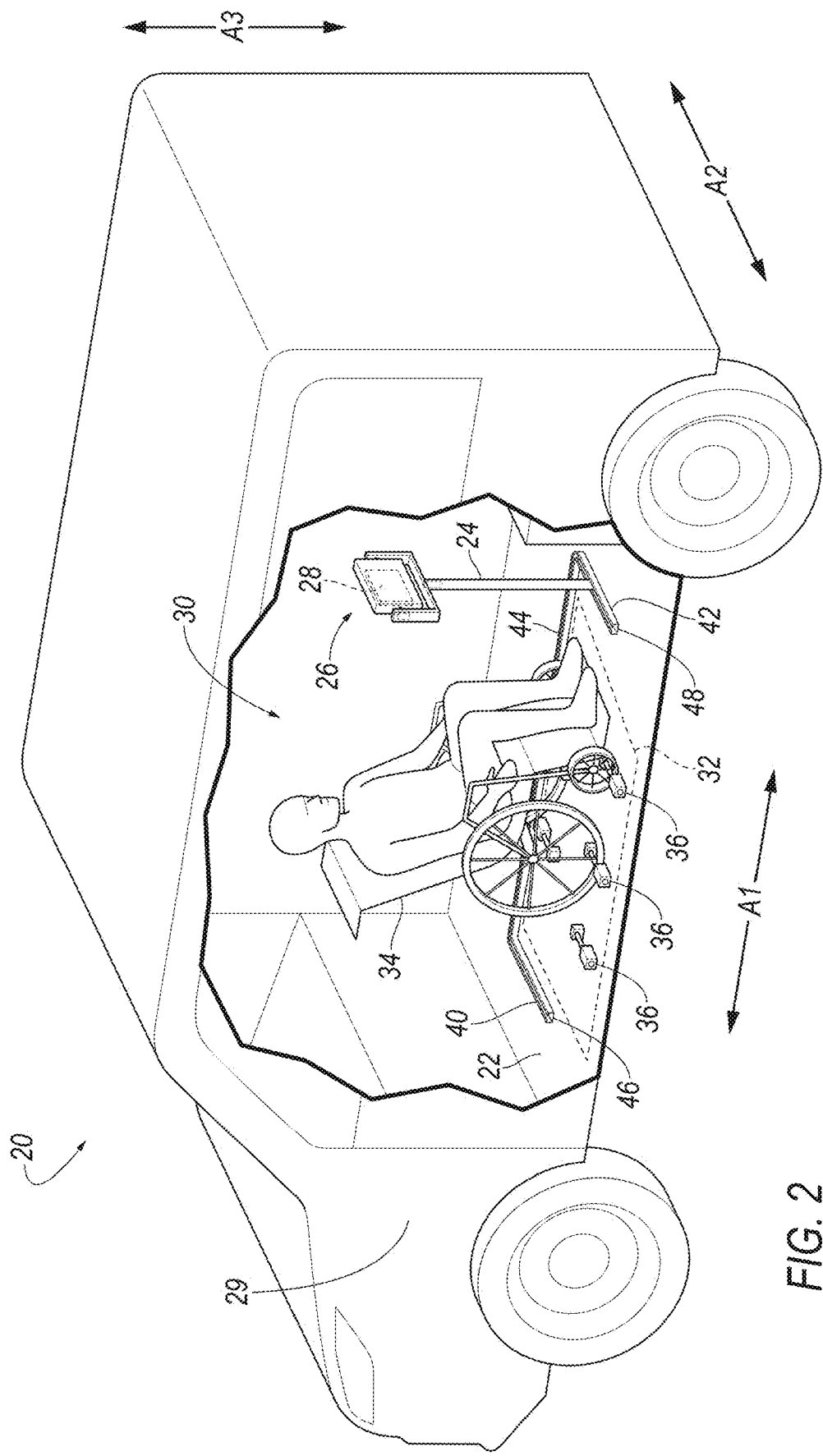
FIG. 2 is a perspective view of the vehicle having the post at a second position and the airbag at the uninflated position.

With reference to FIGS. 1 and 2, the vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 defines a vehicle-longitudinal axis A1 extending between a front vehicle end (not numbered) and a rear vehicle end (not numbered) of the vehicle 20. The vehicle 20 defines a cross-vehicle axis A2 extending cross-vehicle from one side to the other side of the vehicle 20. The vehicle 20 defines a vehicle-vertical axis A3. The vehicle-longitudinal axis A1, the cross-vehicle axis A2, and the vehicle-vertical axis A3 are perpendicular relative to each other.

The vehicle 20 may include a vehicle body 29. The vehicle body 29 includes body panels (not all numbered) partially defining an exterior of the vehicle 20. The body panels may present a class-A surface, e.g., a finished surface exposed to view by a customer and free of unaesthetic blemishes and defects.

The vehicle body 29 defines an occupant compartment 30 to house occupants of the vehicle 20. The occupant compartment 30 may extend across the vehicle 20, i.e., from one side to the other side of the vehicle 20. The occupant compartment 30 includes a front end and a rear end with the front end being in front of the rear end during forward movement of the vehicle 20.

The vehicle floor 22 defines the lower boundary of the occupant compartment 30. The vehicle floor 22 may extend from the front end of the occupant compartment 30 to the rear end of the occupant compartment 30. The vehicle floor 22 may include upholstery, for example, carpet, and may have a class-A surface facing the occupant compartment 30, i.e., a surface specifically manufactured to have a high quality, finished, aesthetic appearance free of blemishes.

The occupant compartment 30 defines a wheelchair seating area 32. The wheelchair seating area 32 is the area occupied by a wheelchair 34 and occupant of the wheelchair 34 when properly seated in the vehicle 20. The wheelchair 34 in the wheelchair seating area 32 may face the front end of the occupant compartment 30, as shown in FIG. 1, or may face the rear end of the occupant compartment 30, as shown in FIG. 2, depending on the direction which the wheelchair 34 faces when installed in the vehicle 20. When the wheelchair 34 is forward-facing, the occupant of the wheelchair 34 faces the front end of the occupant compartment 30. In other words, when the vehicle 20 is in forward motion along a roadway, the wheelchair 34 faces the direction of forward motion of the vehicle 20. When the wheelchair 34 is rearward-facing, the occupant of the wheelchair 34 faces the rear end of the occupant compartment 30. In other words, when the vehicle 20 is in forward motion along a roadway, the occupant faces the opposite direction of the forward motion of the vehicle 20.

The wheelchair 34 may be of any suitable type that supports a seated occupant and provides mobility to the seated occupant, i.e., the wheelchair 34 transports the seated occupant outside of the vehicle 20 and moves the seated occupant in the passenger compartment during ingress to and egress from the vehicle 20. The wheelchair 34 supports the seated occupant in the occupant compartment 30 during operation of the vehicle 20. The wheelchair 34 may include wheels that are latchable to the vehicle floor 22 as described further below.

The vehicle 20 may include a plurality of latches 36 supported by the vehicle floor 22. The latches 36 may engage wheels of the wheelchair 34 to inhibit movement of the wheels of the wheelchair 34 relative to the vehicle floor 22, including along the vehicle-longitudinal axis A1. The latches 36 may be anchored to the vehicle floor 22 and may retractably extend through the wheels of the wheelchair 34. The vehicle 20 may include any suitable number of latches 36 for the number of wheelchairs 34 that may be accommodated by the vehicle 20. The latches 36 may be any suitable type of latches 36. For example, the latches 36 may be of the type that are manually operated by an occupant of the wheelchair 34. In other examples, the latches 36 may be of the type that are electronically operated, e.g., via a solenoid, to latch the wheels of the wheelchair 34, e.g., through a human-machine interface such as a button, switch, touch-screen, etc. In the example in the Figures, the vehicle 20 includes six latches 36. Four latches 36 are used in either direction that the wheelchair 34 may be facing in the vehicle 20.

The vehicle 20 includes a track 38 for guiding movement of the post 24, e.g., relative to the vehicle floor 22 of the vehicle 20. The track 38 is at the vehicle floor 22. The track 38 may be supported by, e.g., fixed to the vehicle floor 22. The track 38 may be C-shaped in cross-section or have any other suitable shape for guiding movement of the post 24, e.g., to permit movement of the post 24 along the track 38 and inhibit movement of the post 24 transverse to the track 38.

The track 38 may extend, at least partially, around the wheelchair seating area 32. For example, as shown in FIGS. 1 and 2, the track 38 may extend around the wheelchair seating area 32 on at least three sides of the wheelchair seating area 32. As described further below, the track 38 extending around the wheelchair seating area 32 allows the post 24 and the support member 26 to move to one or more positions around the occupant depending on a direction the wheelchair 34 is facing.

At least a portion of the track 38 may be vehicle-forward of the wheelchair seating area 32, at least a portion of the track 38 may be vehicle-rearward of the wheelchair seating area 32, and a least a portion may be vehicle-inboard of the wheelchair seating area 32. For example, the track 38 may include a pair of cross-vehicle portions 40, 42 and a vehicle-longitudinal portion 44. The cross-vehicle portions 40, 42 may extend along the cross-vehicle axis A2. The cross-vehicle portions 40, 42 are spaced from each other along the vehicle-longitudinal axis A1. The vehicle-longitudinal portion 44 may extend along the vehicle-longitudinal axis A1, e.g., from one cross-vehicle portion 40, 42 to the other cross-vehicle portion 40, 42. One of the cross-vehicle portions 40, 42, is vehicle-forward of the other of the cross-vehicle portions 40, 42, i.e., one of the cross-vehicle portions 40, 42 is vehicle-rearward of the other of the cross-vehicle portions 40, 42. Specifically, the first cross-vehicle portion 40 is vehicle-forward of the second cross-vehicle portion 42. Said differently, the second cross-vehicle portion 42 is vehicle-rearward of the first cross-vehicle portion 40. The first cross-vehicle portion 40 may be vehicle-forward of the wheelchair seating area 32 and the second cross-vehicle portion 42 may be vehicle-rearward of the wheelchair seating area 32. In other words, the wheelchair seating area 32 is between the first cross-vehicle portion 40 and the second cross-vehicle portion 42 along the vehicle-longitudinal axis A1.

The cross-vehicle portions 40, 42 are elongated at least partially along the cross-vehicle axis A2. In other words, the cross-vehicle portions 40, 42 are longer along the cross-vehicle axis A2 than along the vehicle-longitudinal axis A1. In some examples, the cross-vehicle portions 40, 42 may extend entirely along, i.e., parallel with, the cross-vehicle axis A2. The cross-vehicle portions 40, 42 each extend from a respective distal end 46, 48 to the vehicle-longitudinal axis A1. In other words, the first cross-vehicle portion 40 extends from a first distal end 46 to the vehicle-longitudinal portion 44 and the second cross-vehicle portion 42 extends from a second distal end 48 to the vehicle-longitudinal portion 44.

The vehicle-longitudinal portion 44 is spaced vehicle-inboard from the distal ends 46, 48 of the cross-vehicle portions 40, 42 along the cross-vehicle axis A2. In other words, the vehicle-longitudinal portion 44 is spaced from the distal ends 46, 48 of the cross-vehicle portions 40, 42 toward a cross-vehicle center of the vehicle 20. The vehicle-longitudinal portion 44 is vehicle-inboard of the wheelchair seating area 32. The vehicle-longitudinal portion 44 is elongated along the vehicle-longitudinal axis A1. In other words, the vehicle-longitudinal portion 44 extends longer along the vehicle-longitudinal axis A1 than along the cross-vehicle axis A2. The vehicle-longitudinal portion 44 may be elongated linearly along the vehicle-longitudinal axis A1. The vehicle-longitudinal portion 44 may be parallel with the vehicle-longitudinal axis A1. The vehicle-longitudinal portion 44 extends from one cross-vehicle portion 40, 42 to the other cross-vehicle portion 40, 42. In other words, the vehicle-longitudinal portion 44 extends from the first cross-vehicle portion 40 to the second cross-vehicle portion 42.

The track 38 is continuous from the first distal end 46 of the first cross-vehicle portion 40 to the second distal end 48 of the second cross-vehicle portion 42. In other words, the track 38 is endless from the first distal end 46 of the first cross-vehicle portion 40 to the second distal end 48 of the second cross-vehicle portion 42. The post 24 may slide along the track 38 from the first distal end 46 of the first cross-vehicle portion 40 to the second distal end 48 of the second cross-vehicle portion 42.

The vehicle 20 includes the post 24 to position and support the airbag 28. The post 24 is supported by the vehicle floor 22. In other words, weight of the post 24 is borne by the vehicle floor 22. The post 24 may be elongated along a vertical axis A4 and extend from the vehicle floor 22 toward the vehicle floor 22. The vertical axis A4 may be parallel with the vehicle-vertical axis A3. In the example shown in the Figures, the post 24 may be elongated from the vehicle floor 22 to a top end 50 spaced from the vehicle floor 22. The post 24 may be of any suitable shape. For example, as shown in the Figures, the post 24 may be of a cylindrical shape.

Figure 4:
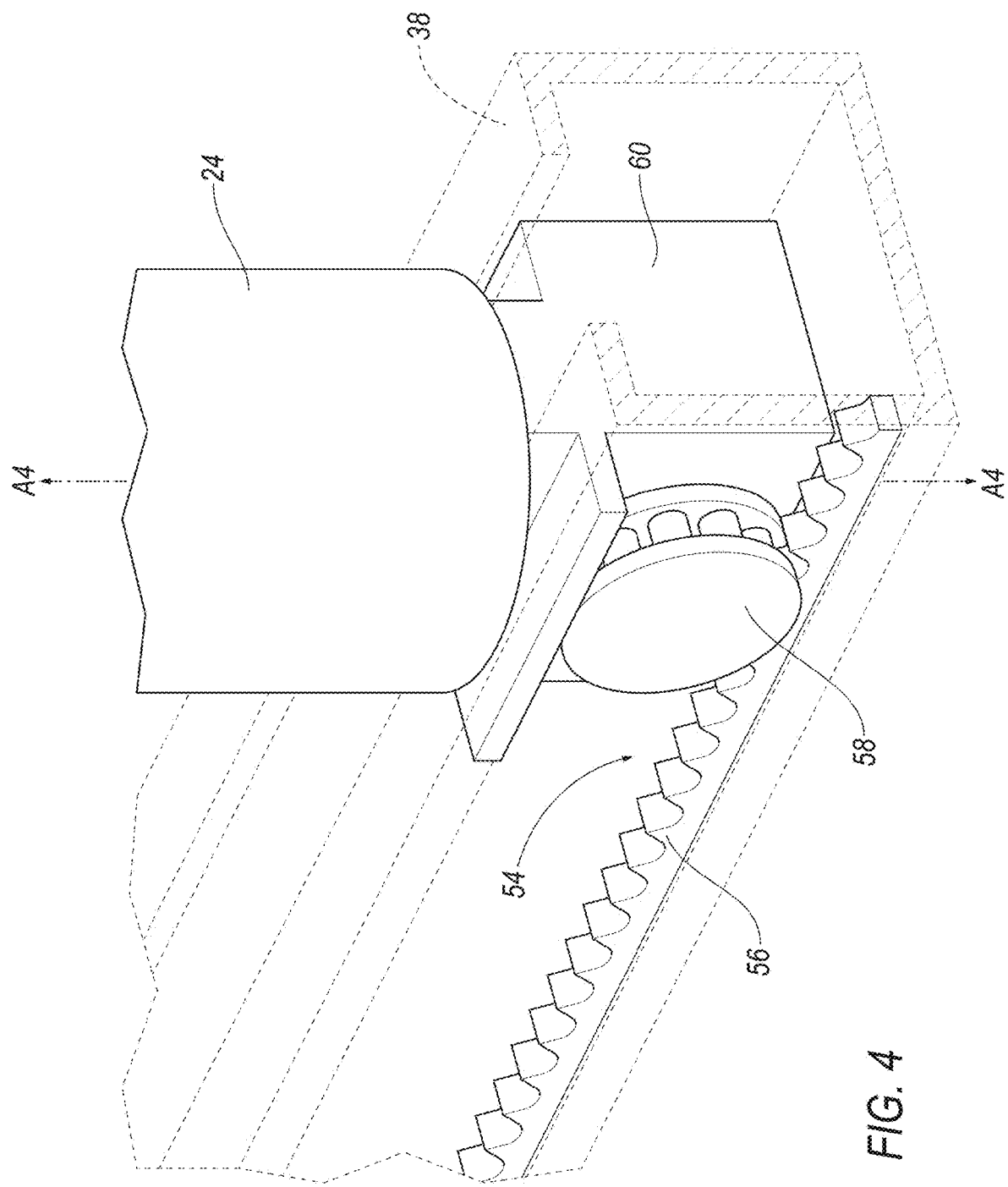
FIG. 4 is a perspective view of a portion of a track supporting the post.

The post 24 is translatable relative to the vehicle floor 22. For example, the post 24 may be slidably engaged with the track 38, e.g., within a channel of the C-shaped cross-section as shown in FIG. 4. The post 24 may be engaged with the track 38 in any suitable way such that the post 24 may be permitted to slide along the track 38 and inhibited from translating transverse to the track 38. In the example shown in the Figures, the post 24 is slidable along the first cross-vehicle portion 40, the second cross-vehicle portion 42, and the vehicle-longitudinal portion 44 of the track 38. In other words, the post 24 is slidable along the track 38 between the first distal end 46 and the second distal end 48.

Figure 5:
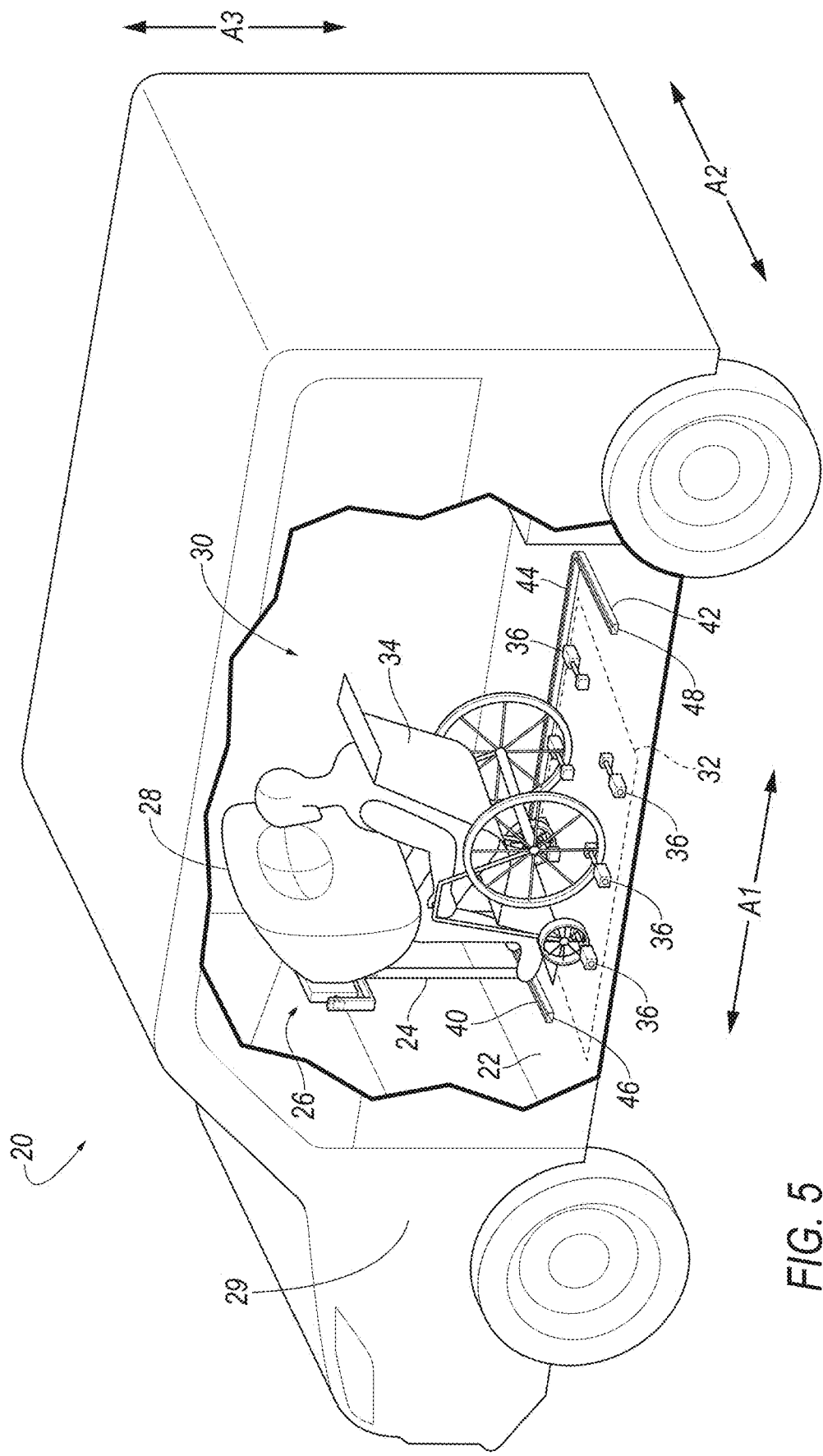
FIG. 5 is a perspective view of a vehicle having the post at the first position and the airbag at an inflated position.
Figure 6:
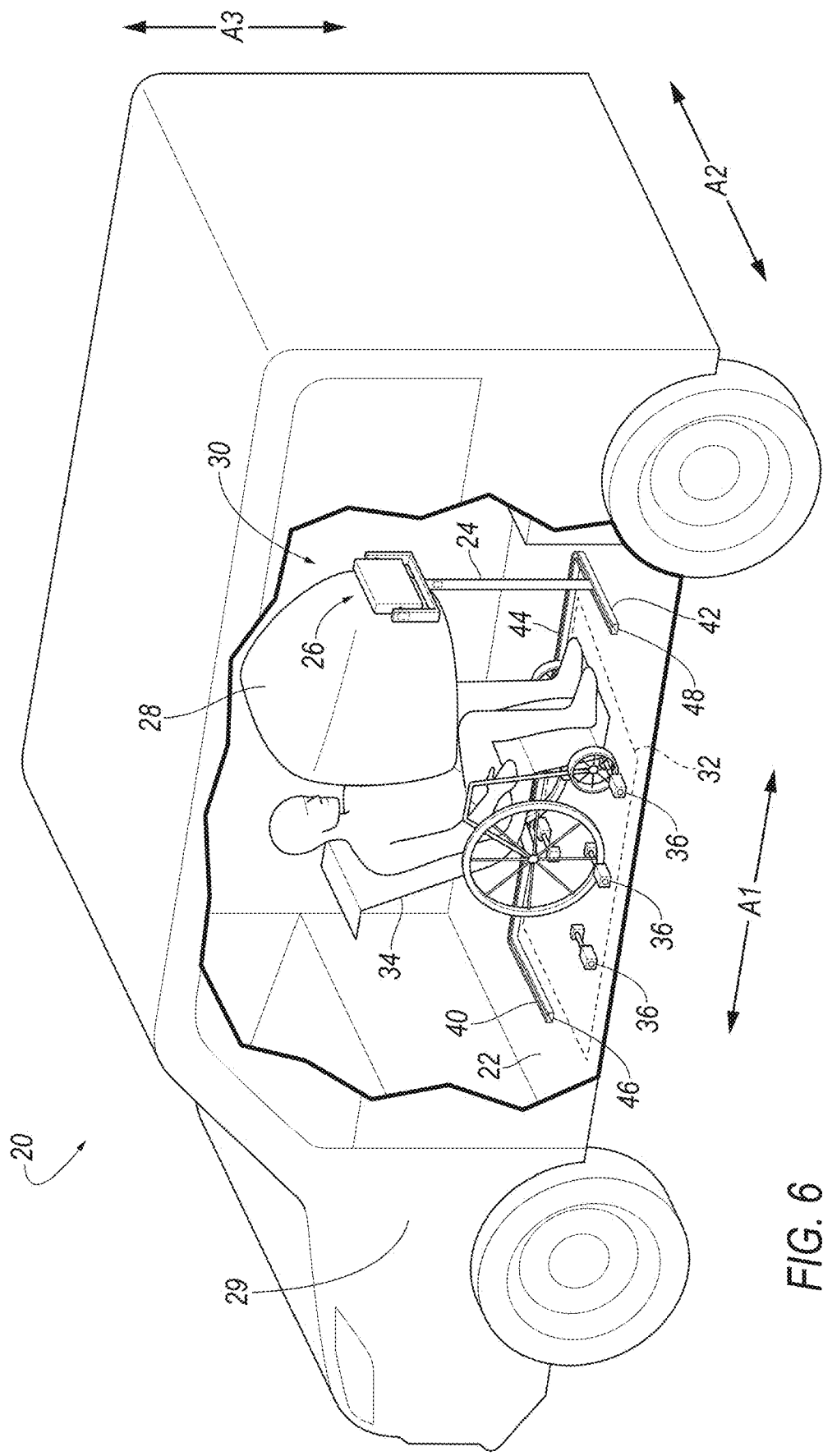
FIG. 6 is a perspective view of the vehicle having the post at the second position and the airbag at the inflated position.

The post 24 is translatable from a first position, shown in FIGS. 1 and 5, to a second position, shown in FIGS. 2 and 6. The post 24 at the first position may be at the first cross-vehicle portion 40 vehicle-forward of the wheelchair seating area 32. The post 24 at the second position may be at the second cross-vehicle portion 42 vehicle-rearward of the wheelchair seating area 32. The post 24 may be moved to the first position or the second position, e.g., in response to a command from a vehicle computer 52. For example, and as further described below, the vehicle computer 52 may command the post 24 to the first position when a wheelchair 34 is secured vehicle-forward facing in the wheelchair seating area 32 and may command the post 24 to the second position when a wheelchair 34 is secured vehicle-rearward facing in the wheelchair seating area 32.

The vehicle 20 may include a first actuator 54 operatively coupled to the post 24 to move the along the track 38 from the first position to the second position, e.g., in response to a command from the vehicle computer 52. The first and second positions are example positions, and the first actuator 54 may move the post 24 to various other positions along the track 38, e.g., depending on a position of an occupant of the vehicle 20. As shown in the FIG. 4, the first actuator 54 may include a rack 56 extending along the track 38, a pinion 58 engaged with the rack 56, and a motor 60 operatively coupled to the pinion 58 to rotate the pinion 58. The rack 56 may be fixed to the track 38. Gear teeth of the pinion 58 may be meshed with gear teeth of the rack 56. The motor 60 may be fixed to the post 24. A drive shaft of the motor 60 may be coupled to the pinion 58 such that torque generated by the motor 60 is transmitted to the pinion 58 to move the post 24 along the track 38. The first actuator 54 may include any other suitable mechanical, electromechanical, pneumatic, and/or hydraulic structure for moving the post 24 along the vehicle floor 22, e.g., belts, pulleys, etc.

The support member 26 is included to position and support the airbag 28, e.g., in the uninflated position and the inflated position. The support member 26 is mounted to the post 24, i.e., such that the support member 26 moves concurrently with the post 24, e.g., along the track 38. The support member 26 is rotatable relative to the post 24, e.g., supported via bushing, bearing, or other suitable structure. The support member 26 is spaced from the vehicle floor 22, e.g., at the top end 50 of the post 24. For example, the support member 26 may be rotatably supported at the top end 50 of the post 24. The support member 26 may be rotatable about the vertical axis A4. Rotation of the support member 26 about the vertical axis A4 changes an azimuth angle of a facing direction of the airbag 28, e.g., in a plane that extends through the cross-vehicle axis A2 and the vehicle-longitudinal axis A1 and to direct inflation of the airbag 28 toward an occupant of the vehicle 20.

The support member 26 may be rotatable from a first orientation, shown in FIGS. 1 and 5, to a second orientation, shown in FIGS. 2 and 6. At the first orientation, the airbag 28 may face vehicle-rearward. At the second orientation, the airbag 28 may face vehicle-forward. The facing direction of the airbag 28 is a direction in which the airbag 28 generally moves when inflated from the uninflated position to the inflated position. The support member 26 may be at the first orientation when the post 24 is at the first position, e.g., to control kinematics of an occupant in a forward-facing wheelchair 34. The support member 26 may be at the second orientation when the post 24 is at the second orientation when the post 24 is at the second position, e.g., to control kinematics of an occupant in a rearward-facing wheelchair 34. The support member 26 may be rotated to numerous orientations other than the first orientation and the second orientation. For example, the support member 26 may be oriented to the right or left of the first orientation and the second orientation, e.g., depending on a position along the cross-vehicle axis A2 of a wheelchair 34 and/or occupant within the vehicle 20.

Figure 3:
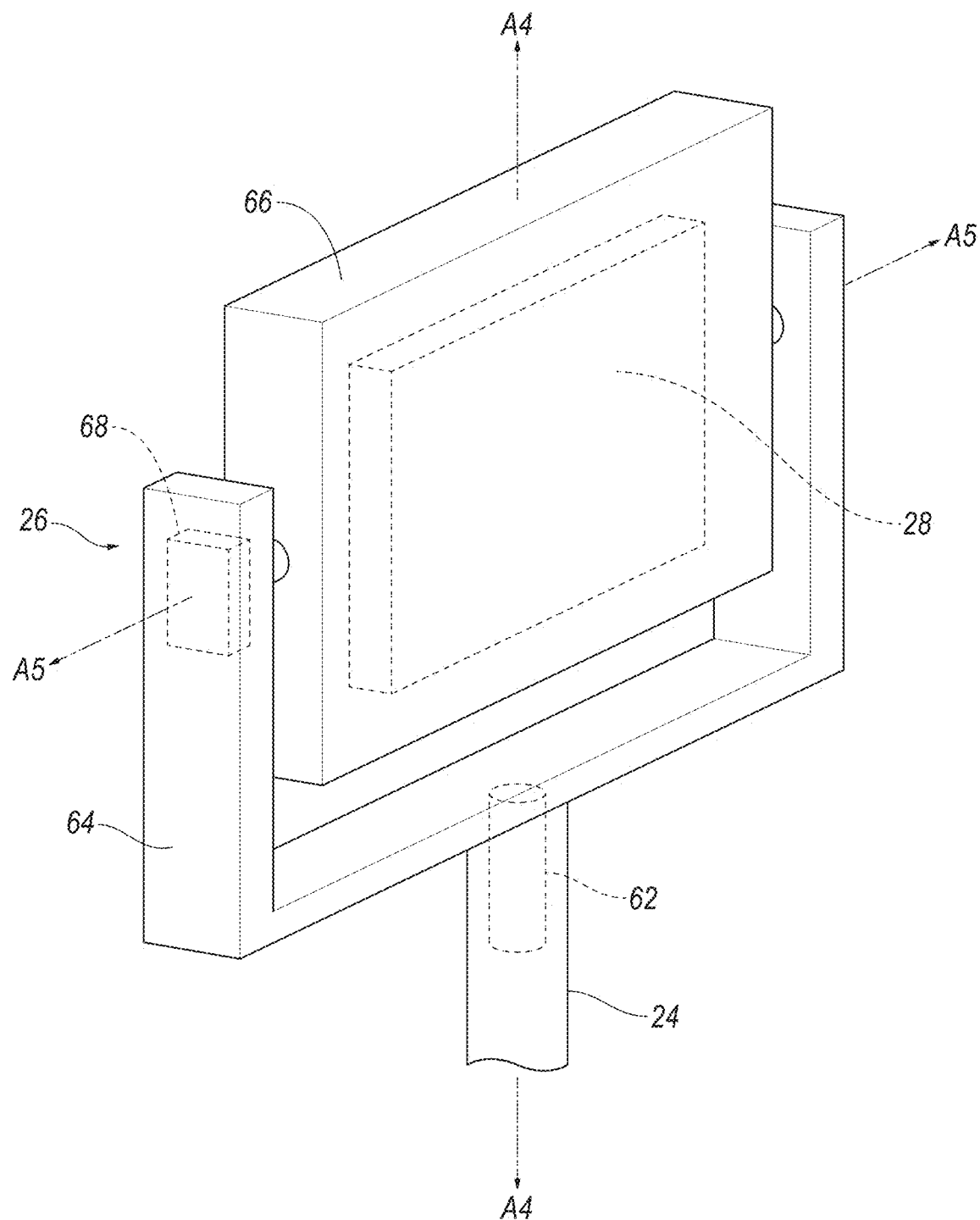
FIG. 3 is a perspective view of a portion of the post with a support member.

With reference to FIG. 3, the vehicle 20 may include a second actuator 62 that can generate force to rotate the support member 26. The second actuator 62 that may rotate the support member 26 to the first orientation, the second orientation, and/or various other orientations, e.g., depending on a position of an occupant of the vehicle 20. The second actuator 62 is operatively coupled to the support member 26 to rotate the support member 26 about the vertical axis A4, e.g., in response to a command from the vehicle computer 52. The second actuator 62 may be supported by the post 24. The second actuator 62 may be fixed to the post 24, e.g., via fastener or other suitable structure.

For example, the second actuator 62 may include a motor. The motor may be supported by, e.g., fixed to the post 24. The motor may be internal of the post 24. A set of reduction gears may couple the motor to the support member 26 such that torque generated by the motor is provided to the support member 26. The second actuator 62 may include any other suitable mechanical, electromechanical, pneumatic, and/or hydraulic structure for rotating the support member 26 about the vertical axis A4, e.g., belts, pulleys, etc.

The support member 26 may be rotatable about a horizontal axis A5. The horizontal axis A5 may be perpendicular to the vertical axis A4. Rotation of the support member 26 about the horizontal axis A5 changes an elevation angle the facing direction of the airbag 28, e.g., to angle the airbag 28 up or down. For example, the support member 26 may include a frame 64 and a base 66. The frame 64 may be mounted to the post 24 and rotate about the vertical axis A4. The base 66 may be supported by the frame 64. The base 66 may be rotatable about the horizontal axis A5 relative to the frame 64. For example, the base 66 may be rotatably supported by the frame 64 via bushings, bearings, etc. The airbag 28 may be fixed to the base 66.

The vehicle 20 may include a third actuator 68 that can generate force to rotate the support member 26. The third actuator 68 may rotate the support member 26 to various orientations, e.g., depending on a position of an occupant of the vehicle 20. The third actuator 68 is operatively coupled to the support member 26 to rotate the support member 26 about the horizontal axis A5, e.g., in response to a command from the vehicle computer 52. The third actuator 68 may be supported by the post 24. In other words, weight of the actuator may be borne by the post 24. For example, the third actuator 68 may include a motor. The motor may be supported by, e.g., fixed to the frame 64 of the support member 26. The motor may be internal of the frame 64. A set of reduction gears may couple the motor to the base 66 such that torque generated by the motor is provided to the base 66 of the support member 26. The third actuator 68 may include any other suitable mechanical, electromechanical, pneumatic, and/or hydraulic structure for rotating the support member 26 about the horizontal axis A5, e.g., belts, pulleys, etc.

The airbag 28 is included to control kinematics of an occupant of the vehicle 20. The airbag 28 is supported by the support member 26, e.g., fixed to the base 66 of the support member 26 via an airbag housing or other suitable structure. The airbag 28 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 28 may include one or more internal tethers (not shown) that maintain the position and shape of the airbag 28 in the inflated position.

The airbag 28 is inflatable from the uninflated position, shown in Figures X-X, to the inflated position, shown in Figures X-X. The airbag 28 in the inflated position may control the kinematics of an occupant of the vehicle 20. The airbag 28 may be inflated to the inflated position, e.g., by the vehicle computer 52, in the event of certain vehicle impacts. A "certain impact" is an impact of the type and/or magnitude for which inflation of the airbag 28 is designed i.e., "certain" indicates the type and/or magnitude of the impact. The type and/or magnitude of such "certain impacts" may be pre-stored in the computer 52, e.g., a restraints control module and/or a body control module. During such an event, the airbag 28 may inflate away from the support member 26 and toward the wheelchair seating area 32. In other words, the airbag 28 may be between the support member 26 and the wheelchair seating area 32 when the airbag 28 is in the inflated position. For example, the airbag 28 in the inflated position may extend from the post 24 toward wheelchair seating area 32 when the post 24 is at both the first position and the second position. FIG. 5 shows the airbag 28 in the inflated position when the post 24 is in the first position at the first orientation. The airbag 28 faces vehicle-rearward when the support member 26 is at the first orientation, e.g. to control kinematics of an occupant of a vehicle-forward facing wheelchair 34. FIG. 6 shows the airbag 28 in the inflated position when the post 24 is in the second position and the support member 26 is at the second orientation. The airbag 28 faces vehicle-forward when the support member 26 is at the second orientation, e.g. to control kinematics of an occupant of a vehicle-rearward facing wheelchair 34.

The support member 26 may include a covering (not numbered) to conceal the airbag 28 during normal operation of the vehicle 20. In the event of certain vehicle impacts where the airbag 28 moves to the inflated position, a releasable seam (not shown) in the covering, e.g., a tear seam, may release to allow the airbag 28 to move to the inflated position.

Figure 7:
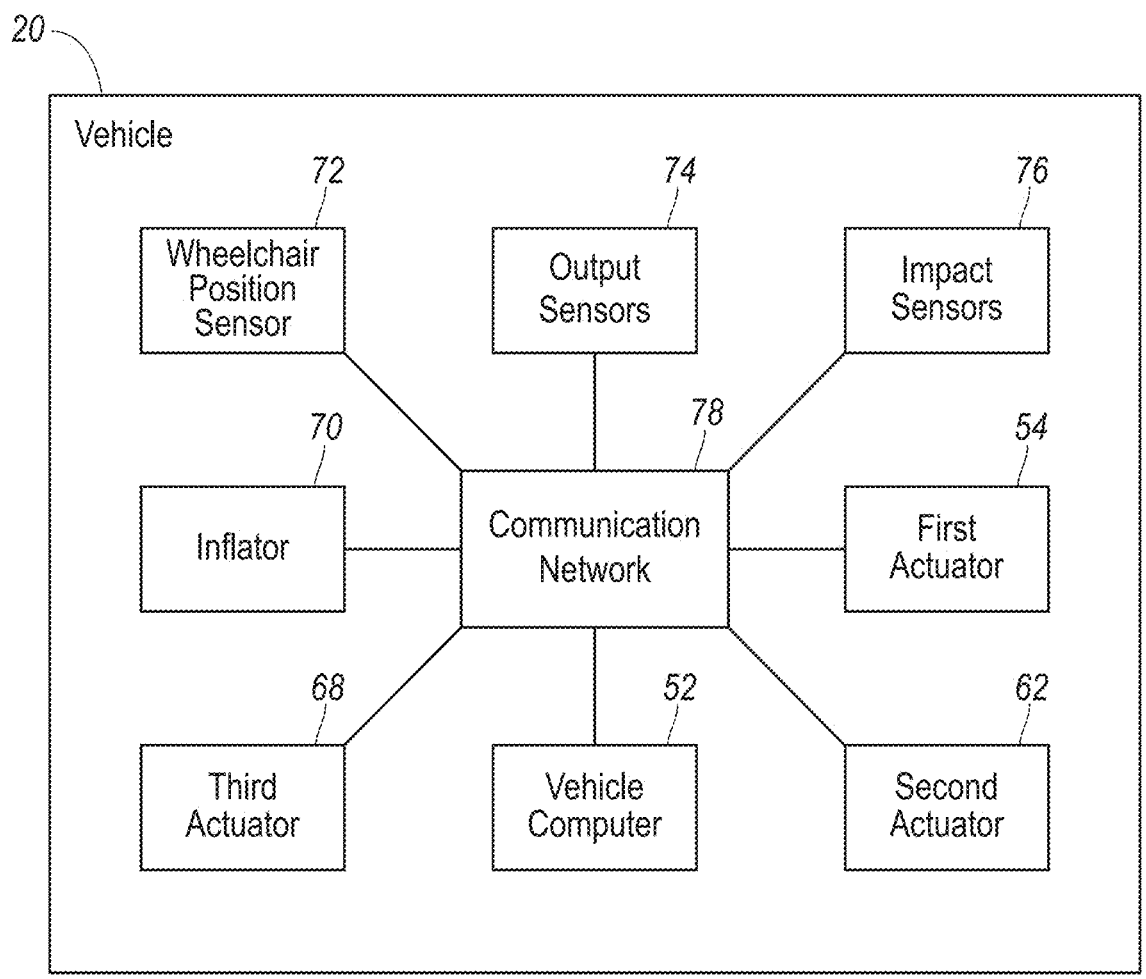
FIG. 7 is a block diagram of components of the vehicle.

With reference to FIG. 7, the vehicle 20 includes an inflator 70 that provides inflation medium to inflate the airbag 28 to the inflated position, e.g., in response to a command from the vehicle computer 52. The inflator 70 is fluidly connected to the airbag 28. The inflator 70 may be, for example, a pyrotechnic inflator that ignites a chemical reaction to generate the inflation medium, a stored gas inflator that releases (e.g., by a pyrotechnic valve) stored gas as the inflation medium, or a hybrid.

The vehicle 20 may include one or more wheelchair position sensors 72 to identify the presence and a position of a wheelchair 34 in the vehicle 20. The wheelchair position sensors 72 may be in communication with the vehicle computer 52 of the vehicle 20. The wheelchair position sensors 72 may send a signal to the vehicle computer 52 to indicate that a wheelchair 34 is present in the vehicle 20 and the position of the wheelchair 34. For example, the wheelchair position sensors 72 may indicate to the vehicle computer 52 whether the wheelchair 34 is forward-facing or rearward-facing. The wheelchair position sensors 72 may be any suitable type of sensors, e.g., weight sensors, cameras, contact switches, proximity sensors, etc.

The vehicle 20 may include one or more occupant sensors 74 that detect characteristics of one or more occupants of the vehicle 20, e.g., a presents, position, orientation, weight, and/or height of an occupant. The occupant sensors 74 may detect characteristics of specific body parts of an occupant, e.g., a position and/or orientation of a head of the occupant. The occupant sensors 74 may detect structures indicative of an occupant, e.g., the presence, position, and/or orientation of a wheelchair 34 in the wheelchair seating area 32. For example, one or more image sensors may be supported within the passenger compartment and be orientated to face the occupant seating area. An image sensor could include one or more cameras, CCD image sensors, CMOS image sensors, etc. As another example, proximity sensors, such as a capacitive proximity sensor, a photoelectric sensor, an infrared proximity sensor, etc., may be used to detect characteristics of one or more occupants of the vehicle 20. The proximity sensors may detect, for example, the presence, the position, and/or the orientation of a wheelchair 34 in the wheelchair seating area 32. As another example, the proximity sensors may detect a height of the occupant, a position of the occupant along the vehicle 20 longitudinal axis, etc. The occupant sensors 74 may include weight sensors, e.g., that detect a load applied to the vehicle floor 22 in the wheelchair seating area 32. The occupant sensors 74 may include contact sensors that detect engagement of one or more latches 36 with a wheelchair 34.

The vehicle 20 may include at least one impact sensor 76 for sensing certain vehicle impacts. The impact sensor 76 is configured to detect certain vehicle impacts. A "certain vehicle impact" is an impact of the type and/or magnitude for which inflation of the airbag 28 is designed i.e., "certain" indicates the type and/or magnitude of the impact. The type and/or magnitude of such "certain vehicle impacts" may be pre-stored in the computer 52, e.g., a restraints control module and/or a body control module. The impact sensor 76 may be of any suitable type, for example, post 24 contact sensors such as accelerometers, pressure sensors, and contact switches; and pre-impact sensors 76 such as radar, LIDAR, and vision sensing systems. The vision sensing systems may include one or more cameras, CCD image sensors, CMOS image sensors, etc. The impact sensor 76 may be located at numerous points in or on the vehicle 20. The impact sensor 76 may be in communication with the vehicle computer 52.

The vehicle 20 may include a communication network 78. The communication network 78 includes hardware, such as a communication bus, for facilitating communication among vehicle 20 components, e.g., the occupant sensor, the vehicle computer 52, the impact sensors 76, the inflator 70, the first actuator 54, the second actuator 62, the third actuator 68, etc. The communication network 78 may facilitate wired or wireless communication among the vehicle 20 components in accordance with a number of communication protocols such as controller area network (CAN), Ethernet, WiFi, Local Interconnect Network (LIN), and/or other wired or wireless mechanisms. Alternatively or additionally, in cases where the vehicle computer 52 comprises a plurality of devices, the communication network 78 may be used for communications between devices represented as the vehicle computer 52 in this disclosure With continued reference to FIG. 7, the vehicle computer 52 includes a processor and a memory storing instructions executable by the processor. The memory includes one or more forms of computer readable media, and stores instructions executable by the vehicle computer 52 for performing various operations, including as disclosed herein. The vehicle computer 52 may be a restraints control module. The vehicle computer 52 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 52 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 52.

The vehicle computer 52 may be programmed to, i.e., the memory may store executable by the processor to, detect a classification of an occupant of the vehicle 20, i.e., an occupant classification. The occupant classification is a certain detected characteristic of the occupant. For example, the occupant classification may include a certain detected occupant height, orientation of the occupant and/or the wheelchair 34 in the wheelchair seating area 32, etc. The vehicle computer 52 may detect the occupant classification based on data received from the occupant sensors 74 and/or the wheelchair position sensors 72 e.g., via the communication network 78. For example, data received from the wheelchair position sensors 72 may specify that the front two pairs of latches 36 are engaged with a wheelchair 34 and indicate that the occupant classification includes a forward-facing wheel chair, or the data received from the wheelchair position sensors 72 may specify that the rear two pairs of latches 36 are engaged with a wheelchair 34 and indicate that the occupant classification includes a rearward-facing wheel chair.

The vehicle computer 52 may be programmed to command the first actuator 54 to move the post 24 along the track 38, e.g., to the first position or the second position, based on a detected occupant classification. For example, the vehicle computer 52 may command the first actuator 54 to move the post 24 to first position when the detected occupant classification indicates that the occupant and/or the wheelchair 34 is facing vehicle-forward. The vehicle computer 52 may command the first actuator 54 to move the post 24 to second position when the detected occupant classification indicates that the occupant and/or the wheelchair 34 is facing vehicle-rearward. As another example, the vehicle computer 52 may store and use a look-up table to the like that associates various occupant classifications with various positions along the track 38 to command the first actuator 54.

The vehicle computer 52 may be programmed to command the second actuator 62 to rotate the support member 26 about the vertical axis A4 based on a detected occupant classification. For example, the vehicle computer 52 may command the second actuator 62 to rotate the support member 26 to first orientation when the detected occupant classification indicates that the occupant and/or the wheelchair 34 is facing vehicle-forward. The vehicle computer 52 may command the second actuator 62 to rotate the post 24 to second orientation when the detected occupant classification indicates that the occupant and/or the wheelchair 34 is facing vehicle-rearward. As another example, the vehicle computer 52 may command the second actuator 62 to rotate the support member 26, e.g., to the right or the left, such that the airbag 28 deploys toward a torso and/or head of the occupant when the detected occupant classification is a position of the occupant, a position specific part of the occupant, and/or a position of the wheelchair 34. The vehicle computer 52 may store and use a look-up table to the like that associates various occupant classifications with various azimuth angles to command the second actuator 62.

The vehicle computer 52 may be programmed to command the third actuator 68 to rotate the support member 26 about the horizontal axis based on a detected occupant classification. For example, the vehicle computer 52 may command the third actuator 68 to rotate the support member 26, e.g., increase or decrease the elevation angle, such that the airbag 28 deploys toward a head of the occupant when the detected occupant classification is a height of the occupant. The vehicle computer 52 may store and use a look-up table to the like that associates various occupant classifications with various elevation angles to command the third actuator 68.

Figure 8:
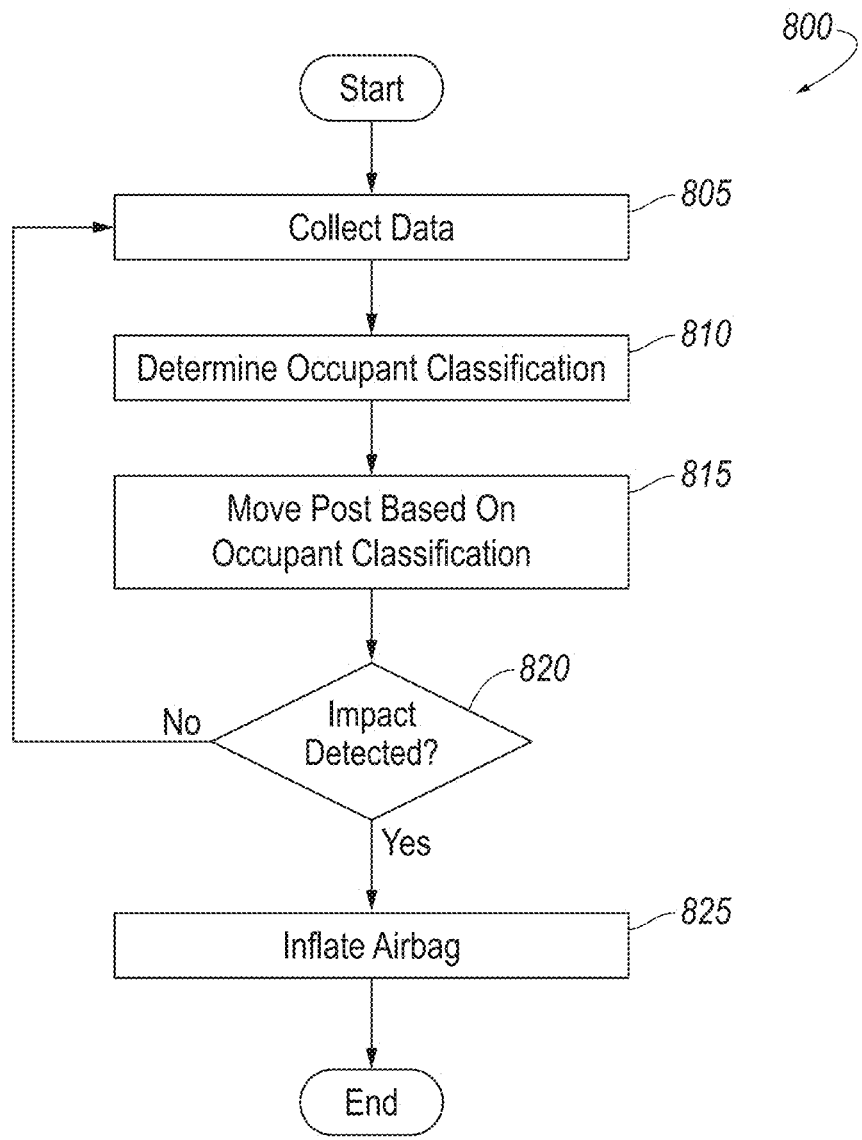
FIG. 8 is a flowchart of a method for controlling the post and the airbag.

FIG. 8 is a process flow diagram illustrating an exemplary process 800 for controlling inflation of the airbag 28. The process 800 may be performed by the vehicle computer 52. In other words, the memory of the vehicle computer 52 may store instructions executable by the processor to perform the process 800. The process 800 begins in a block 805 in which the vehicle computer 52 collects data, e.g., received via the communication network 78 from the occupant sensor, the impact sensor 76, etc. The vehicle computer 52 may continue to receive data throughout the process 800. Throughout the process 800 in the present context means substantially continuously or at time intervals, e.g., every 100 milliseconds. The vehicle computer 52 may store the collected data, as well as other determinations, detections, commands, etc., received, performed, or transmitted throughout the process 800.

Next at a block 810 the vehicle computer 52 detects one or more occupant classifications, e.g., based on data received from the occupant sensors 74. For example, the detected occupant classification may indicate that an occupant of the vehicle 20 is forward-facing or rearward-facing, that a wheelchair 34 in the wheelchair seating area 32 is forward-facing or rearward-facing, a height of an occupant, a position of an occupant along the cross-vehicle axis A2, etc.

Next at a block 815 the vehicle computer 52 commands the first actuator 54, the second actuator 62, and/or the third actuator 68 to move the post 24 along the track 38 to a certain position, to rotate the support member 26 about the vertical axis A4 to a certain orientation, and/or to rotate the support member 26 about the horizontal axis A5 to a certain orientation based on the detected one or more occupant classifications, e.g., as described herein.

At a block 820 the vehicle computer 52 determines whether a certain impact to the vehicle 20 has been detected based on data received from the impact sensors 76. In response to determining that a certain impact has been detected, the vehicle computer 52 moves to a block 825. In response to determining that a certain impact has not been detected, the vehicle computer 52 returns to the block 805.

At the block 825 the vehicle computer 52 inflates the airbag 28 to the inflated position, e.g., by sending a command, such as an electrical pulse, to the inflator 70 via the communication network 78. After the 825 the process 800 may end.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The numerical adjectives "first," "second," etc., are used herein merely as identifiers and do not signify order or importance. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle floor;
a post supported by the vehicle floor, the post being translatable relative to the vehicle floor;
a support member mounted to the post, the support member being rotatable relative to the post about a horizontal axis; and
an airbag supported by the support member.

2. The vehicle of claim 1, wherein the support member is rotatable from a first orientation in which the airbag faces vehicle-rearward to a second orientation in which the airbag faces vehicle-forward.

3. The vehicle of claim 1, wherein the support member is rotatable about a vertical axis.

4. The vehicle of claim 3, further comprising an actuator operatively coupled to the support member to rotate the support member about the vertical axis.

5. The vehicle of claim 4, wherein the actuator is supported by the post.

6. The vehicle of claim 4, further comprising a computer having a processor and a memory storing instructions executable by the processor to command the actuator to rotate the support member about the vertical axis based on a detected occupant classification.

7. The vehicle of claim 1, further comprising an actuator operatively coupled to the support member to rotate the support member about the horizontal axis.

8. The vehicle of claim 7, further comprising a computer having a processor and a memory storing instructions executable by the processor to command the actuator to rotate the support member about the horizontal axis based on a detected occupant classification.

9. The vehicle of claim 8, wherein the detected occupant classification includes a detected occupant height.

10. The vehicle of claim 7, wherein the actuator is supported by the post.

11. The vehicle of claim 1, further comprising a track at the vehicle floor, the post being slidably engaged with the track.

12. The vehicle of claim 11, further comprising an actuator operatively coupled to the post to move the post along the track.

13. The vehicle of claim 12, further comprising a computer having a processor and a memory storing instructions executable by the processor to command the actuator to move the post along the track to a first position or a second position based on a detected occupant classification.

14. The vehicle of claim 12, wherein the actuator includes a rack extending along the track, a pinion engaged with the rack, and a motor operatively coupled to the pinion to rotate the pinion.

15. The vehicle of claim 11, wherein the track includes a pair of cross-vehicle portions and a vehicle-longitudinal portion extending from one cross-vehicle portion of the pair of cross-vehicle portions to the other cross-vehicle portion of the pair of cross-vehicle portions, the pair of cross-vehicle portions extending along a cross-vehicle axis and the vehicle-longitudinal portion extending along a vehicle-longitudinal axis.

16. The vehicle of claim 15, further comprising a wheelchair seating area between the cross-vehicle portions along the vehicle-longitudinal axis.

17. The vehicle of claim 11, further comprising a wheelchair seating area, the track extending around the wheelchair seating area on at least three sides of the wheelchair seating area.

18. A vehicle comprising:
a vehicle floor;
a post supported by the vehicle floor, the post being translatable relative to the vehicle floor;
a support member mounted to the post, the support member being rotatable relative to the post;
an airbag supported by the support member; and
a track at the vehicle floor, the post being slidably engaged with the track;
the track including a pair of cross-vehicle portions and a vehicle-longitudinal portion extending from one cross-vehicle portion of the pair of cross-vehicle portions to the other cross-vehicle portion of the pair of cross-vehicle portions, the pair of cross-vehicle portions extending along a cross-vehicle axis and the vehicle-longitudinal portion extending along a vehicle-longitudinal axis.

19. The vehicle of claim 18, further comprising a wheelchair seating area between the cross-vehicle portions along the vehicle-longitudinal axis.

20. The vehicle of claim 18, further comprising:
an actuator operatively coupled to the support member to rotate the support member relative to the post about a vertical axis and a horizontal axis;
a computer having a processor and a memory storing instructions executable by the processor to command the actuator to rotate the support member about the vertical axis and the horizontal axis based on a detected occupant classification.

* * * * *